(12) United States Patent (10) Patent No.: US 7,656,065 B2
Lampert et al. (45) Date of Patent: Feb. 2, 2010

(54) DRIVE UNIT WITH A HOUSING

(75) Inventors: Rico Lampert, Plymouth, MI (US);
 Thomas Huck, Rheinmuenster (DE);
 Marco Krauth, Sinzheim (DE); **Diyap
 Bueyuekasik, Buehl (DE); Tarek Mili**,
 Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 11/913,613

(22) PCT Filed: Apr. 25, 2006

(86) PCT No.: PCT/EP2006/061806

§ 371 (c)(1),
(2), (4) Date: Nov. 5, 2007

(87) PCT Pub. No.: WO2006/120118

PCT Pub. Date: Nov. 16, 2006

(65) Prior Publication Data

US 2008/0191569 A1    Aug. 14, 2008

(30) Foreign Application Priority Data

May 12, 2005   (DE)   .................. 10 2005 021 950

(51) Int. Cl.
*H02K 5/12* (2006.01)
(52) U.S. Cl. ............................ 310/88; 310/89
(58) Field of Classification Search .................. 310/88,
310/89, 91, 90
See application file for complete search history.

(56) References Cited

U.S. PATENT DOCUMENTS

| 5,215,312 | A | 6/1993 | Knappe et al. |
| 5,668,422 | A | 9/1997 | Deynet |
| 6,092,812 | A | 7/2000 | Ursel et al. |
| 7,211,914 | B2 * | 5/2007 | Hofmann et al. ............... 310/88 |
| 2003/0112513 | A1 * | 6/2003 | Burkhardt et al. ........... 359/515 |
| 2004/0145259 | A1 | 7/2004 | Wysk et al. |

FOREIGN PATENT DOCUMENTS

| DE | 37 16 912 | 12/1988 |
| DE | 196 35 180 | 3/1998 |
| DE | 196 52 926 | 6/1998 |

\* cited by examiner

*Primary Examiner*—Hanh N Nguyen
(74) *Attorney, Agent, or Firm*—Michael J. Striker

(57) ABSTRACT

A drive unit, in particular for adjusting movable parts in a motor vehicle, has a housing including an opening to the surrounding, in which a gas-permeable, liquid-impermeable diaphragm is installed, the housing includes a first housing part with a circumferential collar, and a second housing part which closes off the first housing part, on the second housing part the opening is integrally formed with a circumferential mating surface, which presses the diaphragm against the collar of the first housing part after the housing is closed, and a sealing element located between the diaphragm and the mating surface is integrally non-detachably formed on the first and/or second housing part.

11 Claims, 2 Drawing Sheets

DRIVE UNIT WITH A HOUSING

CROSS-REFERENCE TO RELATED APPLICATION

The invention described and claimed hereinbelow is also described in German Patent Application DE 10 2005 021 950.0 filed on May. 12, 2005. This German Patent Application, whose subject matter is incorporated here by reference, provides the basis for a claim of priority of invention under 35 U.S.C. 119(a)-(d).

BACKGROUND OF THE INVENTION

The present invention relates to a drive unit with a housing, and a method for manufacturing the drive unit of this type.

Publication DE-OS 37 16 912 makes known a housing of a drive device, with which the diaphragm that closes the opening is pressed via a disk-shaped spring element into a pot-shaped housing recess. An annular seal is placed between the diaphragm and the spring element for sealing. The spring element bears against the side wall of the housing recess, thereby pressing the diaphragm against the housing.

Publication DE-OS 196 35 180 also makes known that a waterproof, air-permeable diaphragm is sealed at least at the circumference of a housing opening to the housing wall of a transmission housing.

The designs for fastening the diaphragm have the disadvantage that an additional fixing element must be fabricated and installed, or an additional process step is required to fasten the diaphragm.

SUMMARY OF THE INVENTION

The inventive device and the inventive method with the features of the independent claims have the advantage that, by integrally forming a collar and a mating surface on two different housing parts of the housing, the diaphragm reliably seals the housing opening—practically automatically—when the housing is closed. The collar and the mating surface with the diaphragm between them are positioned relative to each other such that, when the two housing parts are connected, the diaphragm is clamped in a waterproof manner between the collar and the mating surface.

Advantageous refinements of the device and the method described in the independent claims are made possible by the measures listed in the subclaims. When the body of the housing is closed with the cover of the housing connecting elements, the contact pressure between the two housing parts simultaneously generates the contact pressure that serves to press the diaphragm between the collar and the mating surface. Clips or snap-in elements, screws or rivets are particularly well-suited for use as connecting elements. As an alternative, the two housing parts may also be interconnected via bonding or welding in a manner such that sufficient contact pressure between the collar and the mating surface is generated.

To increase the sealing effect and/or to reduce the contact pressure, a sealing element is provided between the diaphragm and the mating surface, or between the diaphragm and the collar, which seals off the diaphragm from the surroundings in a waterproof manner.

A conventional O-ring, for example, may be used as the sealing element, which is inserted as a separate component between the collar and the mating surface before the housing is closed.

In a preferred embodiment of the present invention, the sealing element is secured to at least one of the two housing parts. For example, the sealing element is injected, as a soft component made of plastic or rubber, onto the hard component (housing part) using a two component injection-moulding process. Since a seal is also injected onto one of the two housing parts for the sealing surface between the two housing parts, there is no need for an additional working step to integrally form the sealing element for the diaphragm. The diaphragm is then sealed off in one process, exactly analogous to the process of sealing the two housing parts to each other.

The collar is preferably formed on a vertical wall of the housing part that bears against the bottom surface of the shell-shaped housing part. The contact forces applied by the mating surface may therefore be absorbed directly by the shell-shaped housing part when the housing is closed, without the collar being displaced from its position. The wall is designed, e.g., as a cylindrical jacket that is integrally formed on the bottom surface of the housing part. The collar is designed as an annular surface inside or on the end face of the cylindrical jacket.

Lateral openings are formed in the cylindrical wall for ventilation, which allow air to move from the interior of the housing to the diaphragm, and from the diaphragm to the surroundings.

It is advantageous when the collar is integrally formed as an annular surface in the cylindrical wall. Together with the cylindrical wall, the annular surface forms a pot-shaped recess in which the diaphragm is inserted. As a result, a circular diaphragm may be positioned very easily. When the mating surface is integrally formed on an annular projection of the other housing part, the mating surface may also be adjusted very easily relative to the collar given that the projection engages in the pot-shaped recess. The diaphragm may therefore be sealed reliably using a simple design.

To ensure that the diaphragm is pressed reliably between the two housing parts when the two housing parts are assembled with each other, the mating surface and the matching surface of the collar are located nearly in the same plane as the parting plane between the two housing parts. The maximum contact pressure for the diaphragm is therefore attained with an optimum distance between the collar and the mating surface when the housing is closed in the assembly direction.

The inventive fastening of the diaphragm may be realized particularly advantageously with a shell-shaped housing by locating the entire electric motor and the transmission in a lower shell before closing the lower shell with an upper shell, which is designed as a cover. The two shell elements are joined radially relative to the armature shaft, and the mating surface is simultaneously pressed against the diaphragm and the collar.

The inventive method for manufacturing a drive unit has the advantage that, via the insertion of the diaphragm and positioning the electric motor and the transmission in the first housing part, an additional assembly step that would be required to secure the diaphragm is eliminated. When the two housing parts are connected, the diaphragm is simultaneously clamped between the collar and the mating surface in the same working step.

When the sealing element for the diaphragm is formed as a single piece on one of the two housing parts, an additional process step is not required to provide this seal and install it. The sealing element may be integrally formed on the collar or the mating surface, for example, or it may be inserted, as a separate sealing element, together with the diaphragm.

Exemplary embodiments of an inventive drive device are presented in the drawing and are described in greater detail in the description below.

DESCRIPTION OF THE PREFERRED EMBODIMENTS

Figure 1:
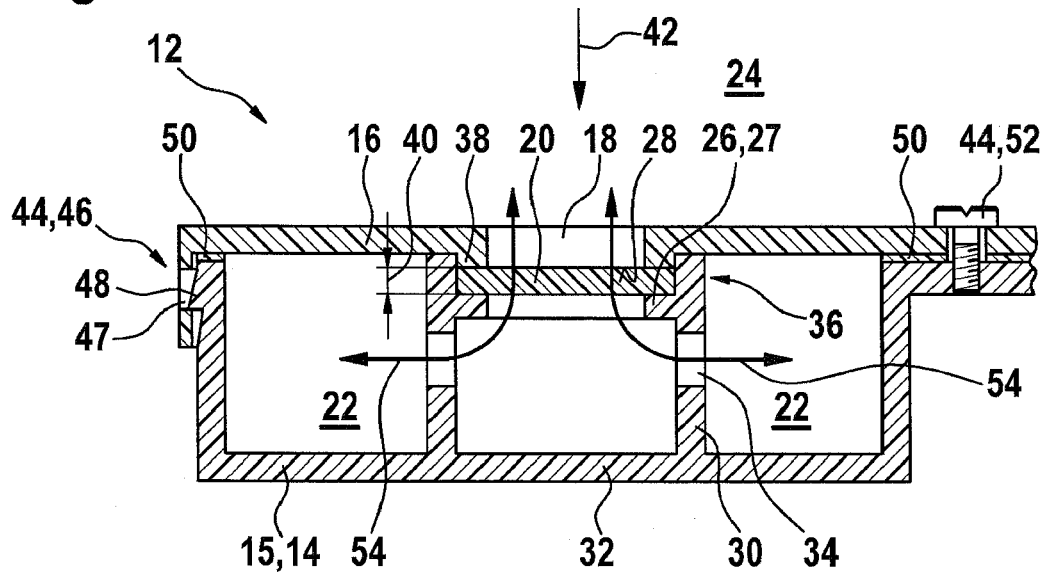
FIG. 1 shows a schematic cross section through a housing of an inventive drive device.

FIG. 1 shows a housing 12 of a drive device 10, which includes a first, lower housing part 14 and a second, upper housing part 16. Housing 12 includes an opening 18, which is covered with a gas-permeable, liquid-impermeable diaphragm 20. Diaphragm 20 allows gas to pass freely from a housing interior 22 into surroundings 24 without allowing moisture to enter the housing interior. PTFE, and Gorotex in particular, are used as the material for diaphragm 20. To fasten diaphragm 20 in a waterproof manner, it is clamped between collar 26 of first housing part 14 and a mating surface 28 of second housing part 16. Collar 26 is designed as an annular surface 27 that is integrally formed in a cylindrical wall 30. In this case, cylindrical wall 30 is designed with a bottom surface 32 of first housing part 14. Wall 30, which is designed as a cylindrical jacket, includes lateral openings 34, which are designed as through-openings and connect housing interior 22 via diaphragm 20 with surroundings 24. Arrows 54 are drawn in FIG. 1 that indicate gas exchange 54 between surroundings 24 and housing interior 22 via opening 18, diaphragm 20, and lateral openings 34 in wall 30. The part of wall 30 above collar 26 forms a pot-shaped recess 36 with collar 26, in which diaphragm 20 is inserted. Second housing part 16 includes an annular projection 38, on which annular mating surface 28 is integrally formed. In the closed state of housing 12, mating surface 28 engages via projection 38 in pot-shaped recess 36. Distance 40 between collar 26 and mating surface 28 is chosen such that, when housing 12 is closed in assembly direction 41, a contact pressure 42 is generated that fixedly clamps diaphragm 20 between collar 26 and mating surface 28. In FIG. 1, first housing part 14 is designed as housing shell 15, and it is closed with second housing part 16, which is designed as cover 17. In the left half of the picture, the two housing parts 14, 16 are interconnected using connecting elements 44, which are designed as clips or snap-in elements 46. Snap-in eyelets 47 are formed in second housing part 16, which snap into latches 48 formed in first housing part 14 when housing part 16 is pressed against first housing part 14. A seal 50 is located between first and second housing parts 14, 16, which is injection-moulded, e.g., onto second housing part 16 and closes housing 12 in a waterproof manner. A screw 52, as a connecting element 44 with which second housing part 16 is secured to first housing part 14, is shown on the right side in FIG. 1. Housing 12 is designed such that sufficient contact pressure 42 for diaphragm 20 is produced when the connecting forces are applied by connecting elements 44.

Figure 2:
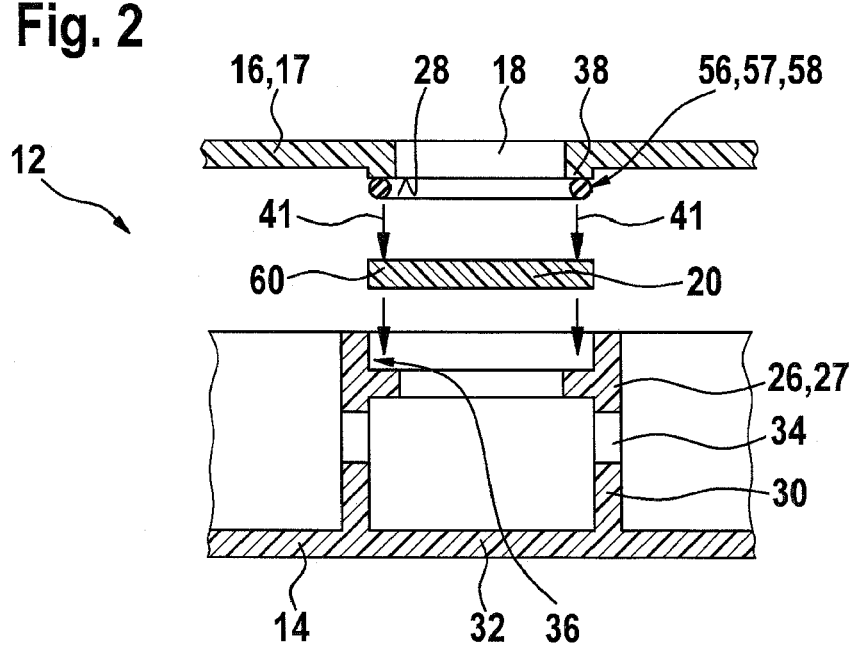
FIG. 2 shows a section of a housing before the diaphragm is installed.

FIG. 2 shows a variation of the design according to FIG. 1, with which a separate component 57 is inserted, as sealing element 56, between diaphragm and mating surface 28. Sealing element 56 is designed, e.g., as an O-ring 58 that is placed on an outer circumferential region 60 of diaphragm 20 after diaphragm 20 is inserted. Assembly direction 41 is indicated using arrows 41, which extend in the same direction as contact pressure 42. FIG. 2 also illustrates the simplicity of the inventive manufacturing method. Diaphragm 20 is located on collar 26 of first housing part 14. A sealing element 56, 58 is also placed on diaphragm 20, then second housing part 16 is connected with first housing part 14. As an alternative to connecting elements 44 shown in FIG. 1, housing 12 may also be closed via bonding, laser welding, or ultrasonic welding. Contact pressures 42, which secure diaphragm 20 against housing 12 in a waterproof manner, are generated by the closing forces between the housing parts 14 and 16.

Figure 3:
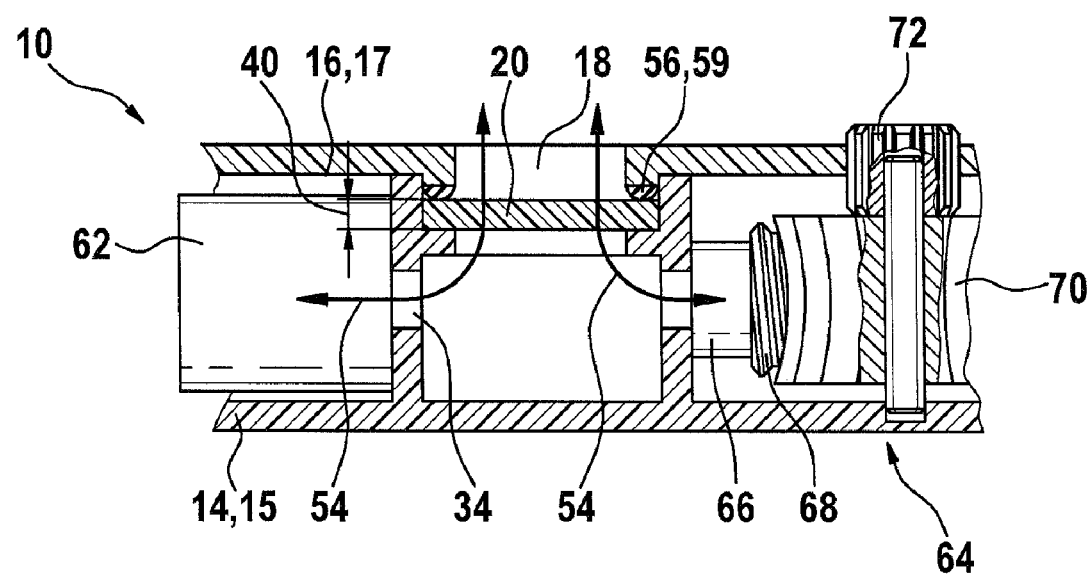
FIG. 3 shows a further exemplary embodiment of an inventive drive device, in a cross-sectional view.

In a further exemplary embodiment, as shown in FIG. 3, sealing element 56 is integrally and fixedly formed on second housing part 16. Housing parts 14 and 16 are made, e.g., of hard plastic, with a sealing soft component 59—designed as sealing element 56—being injected onto second housing part 16 using a two-component injection moulding process. Sealing element 56 is made of plastic or rubber and is formed in the same fabrication process as the integral forming of seal on second housing part 14. As shown in FIG. 3, sealing element 56 is integrally formed directly on mating surface 28, so that sealing element 56 is automatically assembled when second housing part 16 is assembled. When distance 40 is selected, the dimensions of sealing element 56 and the thickness of diaphragm 20 are taken into account. In this exemplary embodiment, complete electric motor 62, with a transmission 64 connected thereto, is placed in first shell-shaped housing part 14, 15 before second housing part 16 is assembled. The torque is transferred by an armature shaft 66—on which a worm 68 is located—to a wormwheel 70, which, in turn, drives an output element 72. With this, a not-shown, movable component in a motor vehicle, e.g., a window pane or a sunroof, may be displaced.

It should be noted that, with regard for the exemplary embodiments presented in the figures and the description, many different combinations of the individual features are possible. For example, the function of the first and second housing part 14, 16 may be reversed, or housing parts 14, 16 may be designed as nearly identical half shells 15. The specific design of collar 26 and mating surface 28, and their spacial positioning may also be adapted to housing 12 and/or its connecting forces. The design and location of sealing element 56 may also be varied, as may the selection of the suitable process for connecting housing parts 14 and 16. Drive device 10 is preferably used to displace movable parts in a motor vehicle, but it is not limited to this application.

What is claimed is:

1. A drive unit (10), in particular for adjusting movable parts in a motor vehicle, with a housing (12), which includes an opening (18) to the surroundings (24), in which a gas-permeable, liquid-impermeable diaphragm (20) is installed, wherein the housing (12) includes a first housing part (14) with a circumferential collar (26), and a second housing part (16), which closes off the first housing part (14); on the second housing part (16), the opening is integrally formed with a circumferential mating surface (28), which presses the diaphragm (20) against the collar (26) of the first housing part (14) after the housing (12) is closed, wherein a sealing element (56, 58, 59) is located between the diaphragm (20) and the mating surface (28), wherein the sealing element (56, 58, 59) is non-detachbly formed on the first and/or second housing part (14, 16), using a 2-component injection-molding process, in particular.

2. A drive unit (10), in particular for adjusting movable parts in a motor vehicle, with a housing (12), which includes an opening (18) to the surroundings (24), in which a gas-permeable, liquid-impermeable diaphragm (20) is installed, wherein the housing (12) includes a first housing part (14) with a circumferential collar (26), and a second housing part (16), which closes off the first housing part (14); on the second housing part (16), the opening is integrally formed with a circumferential mating surface (28), which presses the diaphragm (20) against the collar (26) of the first housing part (14) after the housing (12) is closed, wherein a wall (30) of the first housing part (14) is cylindrical in design and includes at least one lateral ventilation opening (34) that extends from the housing interior (22) to the opening (18).

3. The drive unit (10) as recited in claim 2, wherein the first and second housing parts (14, 16) are interconnected in a waterproof manner using connecting elements (44, 46, 52) such as snap-in elements (46), screws (52), rivets, or using connecting processes such as bonding, laser welding, or ultrasonic welding.

4. The drive unit (10) as recited in claim 2, wherein a sealing element (56, 58, 59) is located between the diaphragm (20) and the mating surface (28); the collar (26) and the mating surface (28) are annular in design, in particular.

5. The drive unit (10) as recited in claim 4, wherein the sealing element (56) is designed as a separate component (57, 58), in particular as an O-ring.

6. The drive unit (10) as recited in claim 2, wherein the collar (26) is designed as a pot-shaped recess (36) in the cylindrical wall (30) of the first housing part (14), the mating surface (28) engaging in the pot-shaped recess (36) when the second housing part (16) is installed.

7. The drive unit (10) as recited in claim 2, wherein the collar (26) and the mating surface (28) are located in a plane that is approximately perpendicular to the assembly direction (41) of the two housing parts (14, 16).

8. A drive unit (10), in particular for adjusting movable parts in a motor vehicle, with a housing (12), which includes an opening (18) to the surroundings (24), in which a gas-permeable, liquid-impermeable diaphragm (20) is installed, wherein the housing (12) includes a first housing part (14) with a circumferential collar (26), and a second housing part (16), which closes off the first housing part (14); on the second housing part (16), the opening is integrally formed with a circumferential mating surface (28), which presses the diaphragm (20) against the collar (26) of the first housing part (14) after the housing (12) is closed, wherein at least one of the two housing parts (14, 16) is designed as a shell element (15) that accommodates an electric motor (62) and a transmission (64), which is driven by an armature shaft (66), and is closable radially to the armature shaft (66) of the electric motor (62) using the other housing part (14, 16).

9. A method for manufacturing a drive unit (10), in particular for adjusting movable parts in a motor vehicle, with a housing (12), which includes an opening (18) to the surroundings (24), in which a gas-permeable, liquid-impermeable diaphragm (20) is installed, wherein the housing (12) includes a first housing part (14) with a circumferential collar (26), and a second housing part (16), which closes off the first housing part (14); on the second housing part (16), the opening is integrally formed with a circumferential mating surface (28), which presses the diaphragm (20) against the collar (26) of the first housing part (14) after the housing (12) is closed, the method comprising the following steps:
- An electric motor (62) and a transmission (64) are inserted in the first housing part (14, 15),
- A gas-permeable, liquid-impermeable diaphragm (20) is placed on an annular collar (26) of the first housing part (14, 15),
- The second housing part (16) is placed, as a cover (17), on the first housing part (14, 15) in order to close the housing (12), and a mating surface (28)—that surrounds an opening (18) in the second housing part (16)—for the diaphragm (20) is positioned such that it overlaps the collar (26),
- The two housing parts (14, 16) are connected with each other in a waterproof manner, by way of which the diaphragm (20) is pressed between the collar (26) and the mating surface (28) in a waterproof manner.

10. The method as recited in claim 9, wherein a sealing element (56, 57, 58, 59) is located underneath or above the diaphragm (20), which seals the diaphragm (20) against the collar (26) and/or against the mating surface (28) in a waterproof manner after the two housing parts (14, 16) are closed.

11. A drive unit (10), in particular for adjusting movable parts in a motor vehicle, with a housing (12), which includes an opening (18) to the surroundings (24), in which a gas-permeable, liquid-impermeable diaphragm (20) is installed, wherein the housing (12) includes a first housing part (14) with a circumferential collar (26), and a second housing part (16), which closes off the first housing part (14); on the second housing part (16), the opening is integrally formed with a circumferential mating surface (28), which presses the diaphragm (20) against the collar (26) of the first housing part (14) after the housing (12) is closed, wherein the collar (26) and/or the mating surface (28) are/is integrally formed on a wall (30) of the first housing part (14) that bears against a bottom surface (28) of the second housing part (16), wherein the wall (30) of the first housing part (14) includes at least one lateral ventilation opening (34) that extends from the housing interior (22) to the opening (18).

* * * * *